Oct. 25, 1966  L. VADAS  3,280,868
PITTING HEAD FOR FRUIT PREPARATION MACHINE
Original Filed July 1, 1963  7 Sheets-Sheet 1
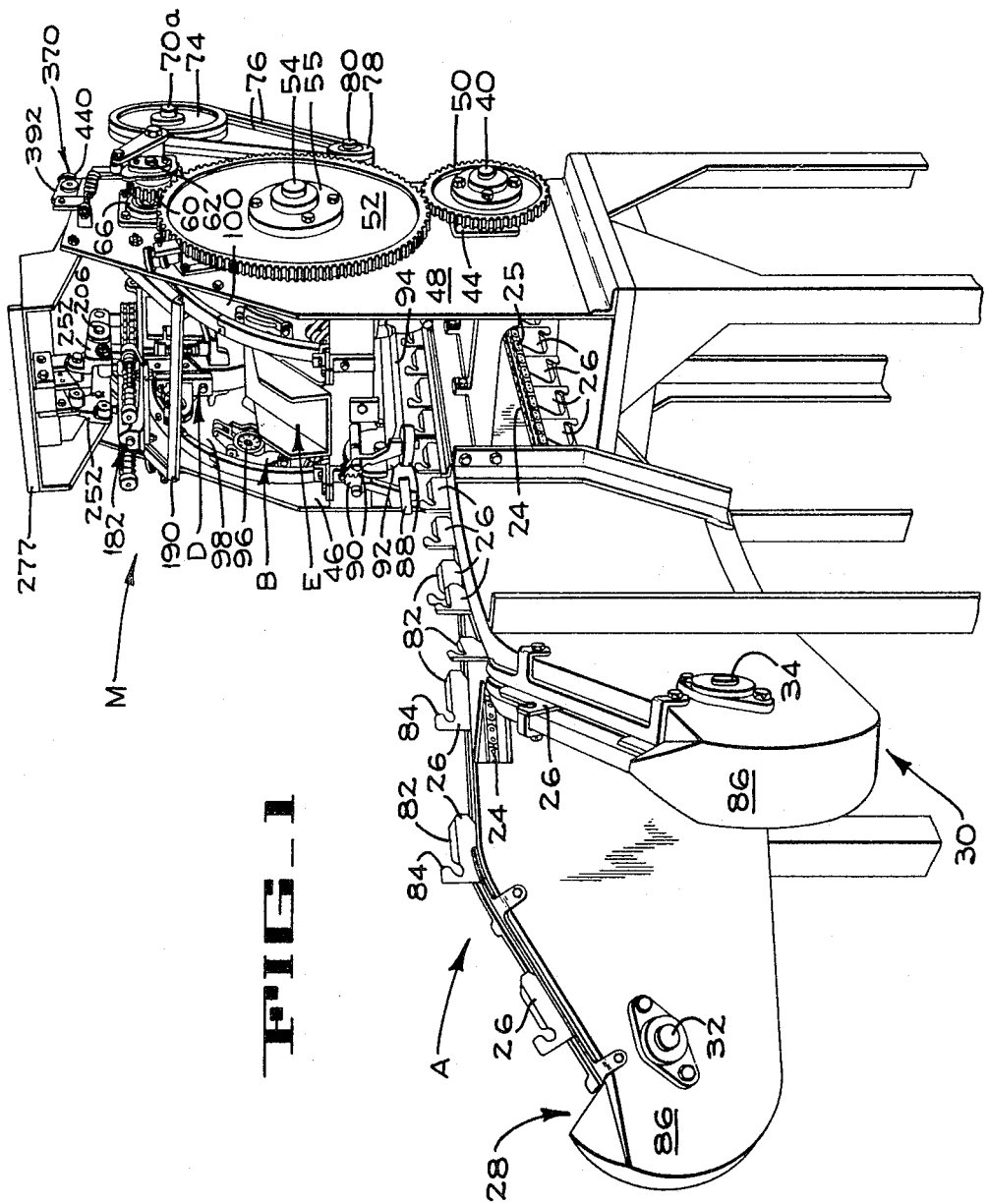
FIG_1
INVENTOR
LESLIE VADAS
BY Hans G. Hoffmeister
ATTORNEY

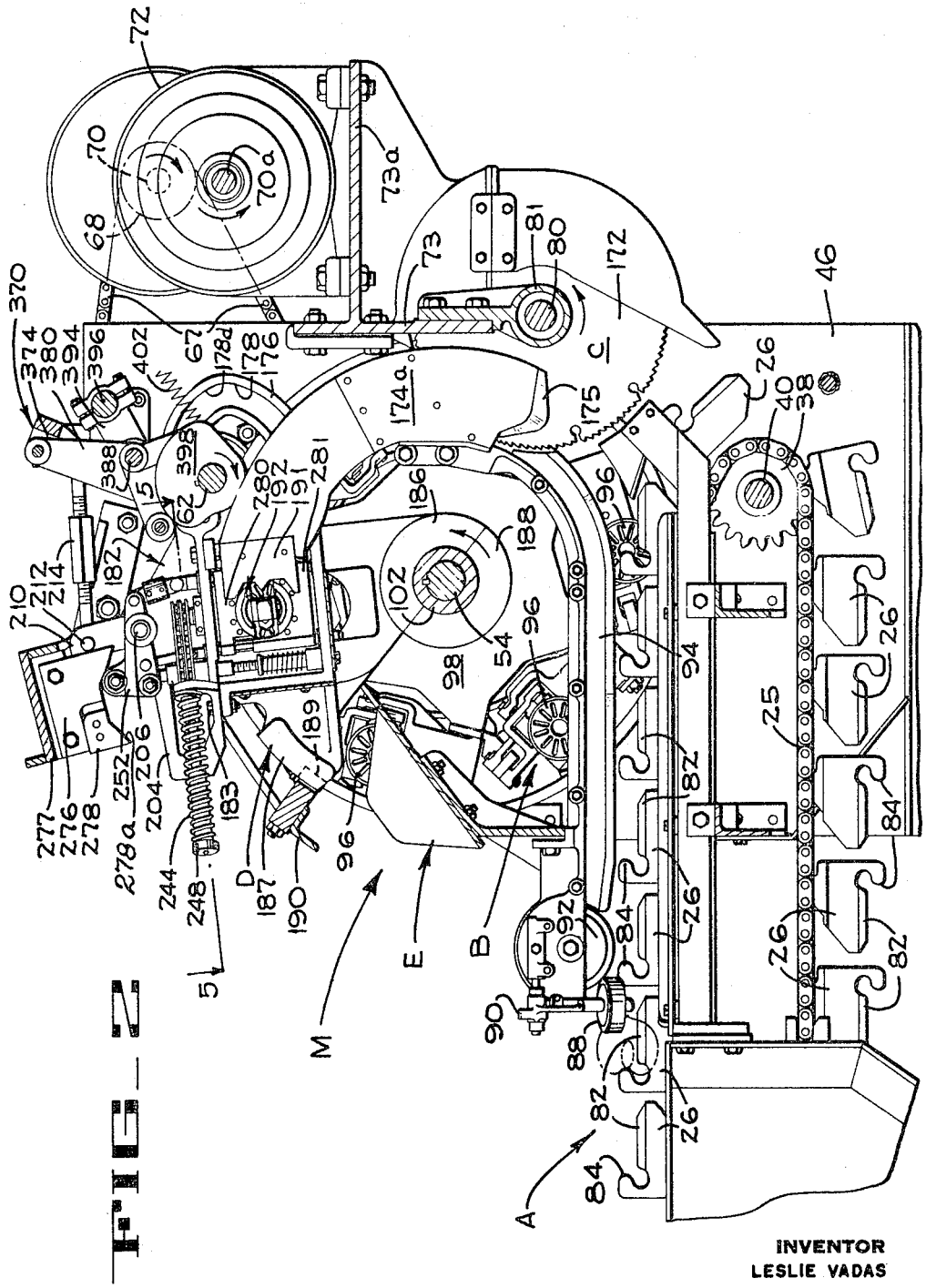

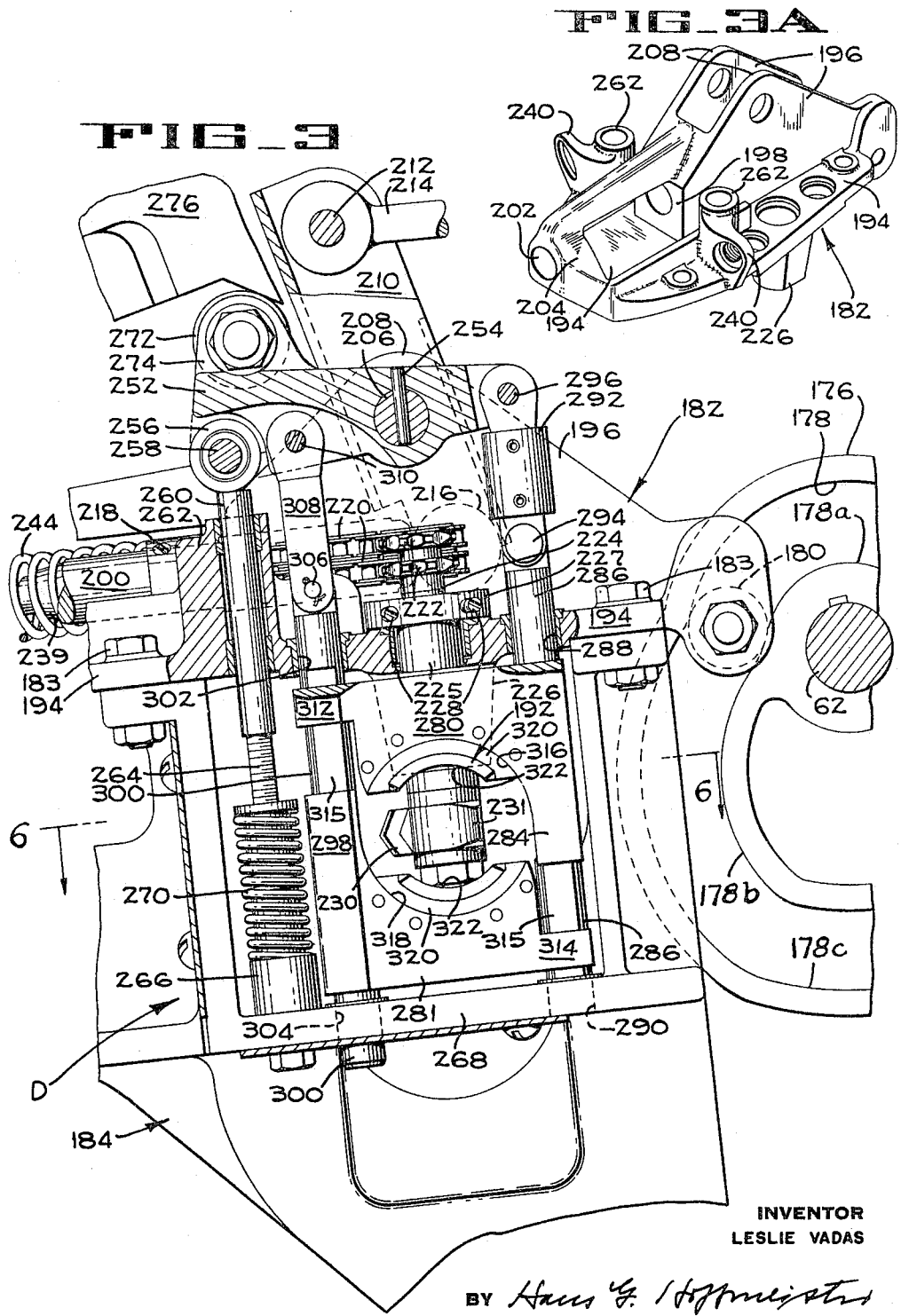

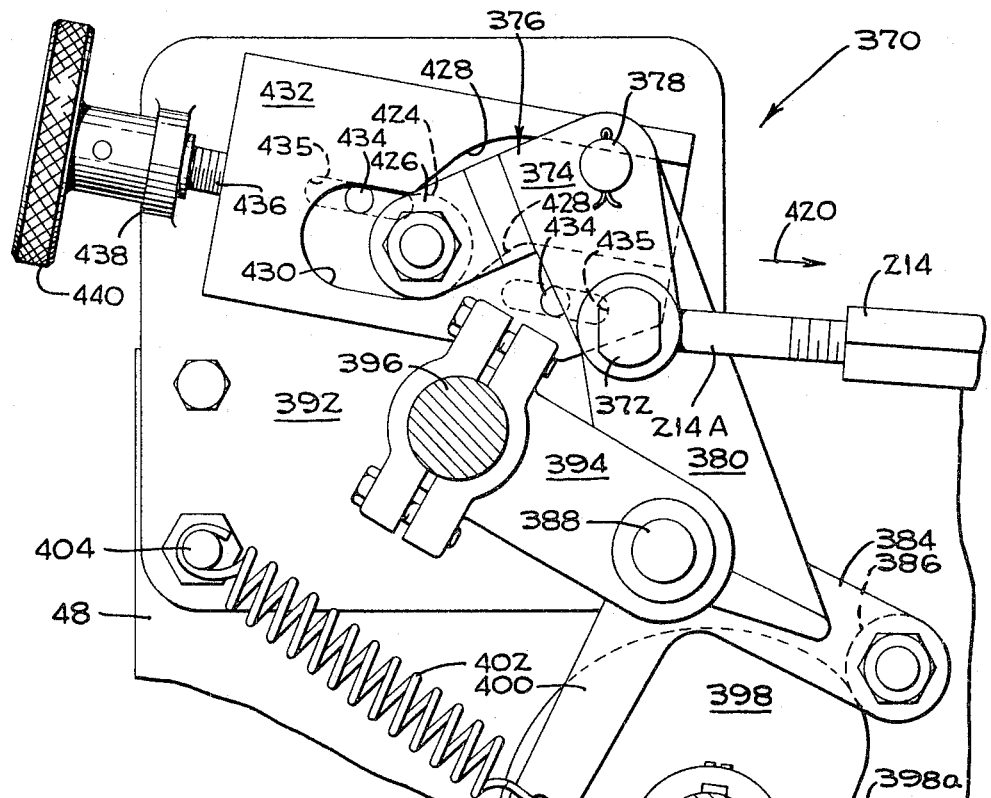
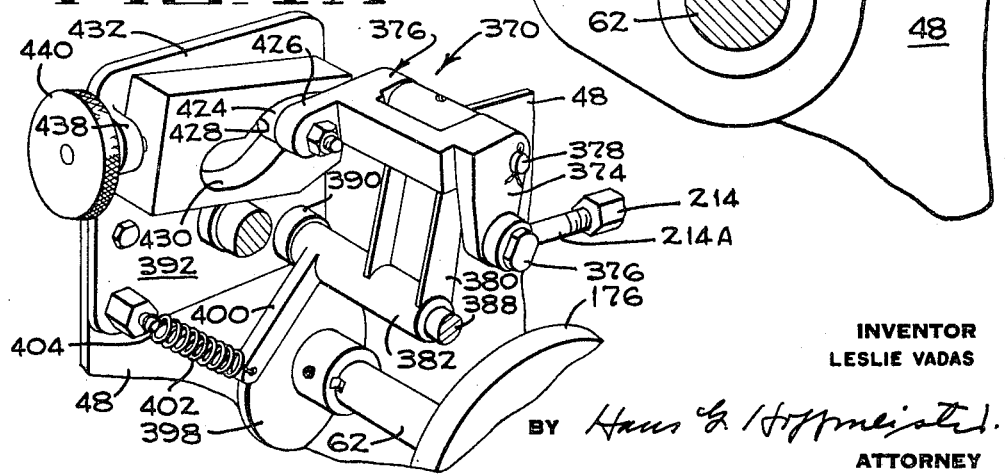

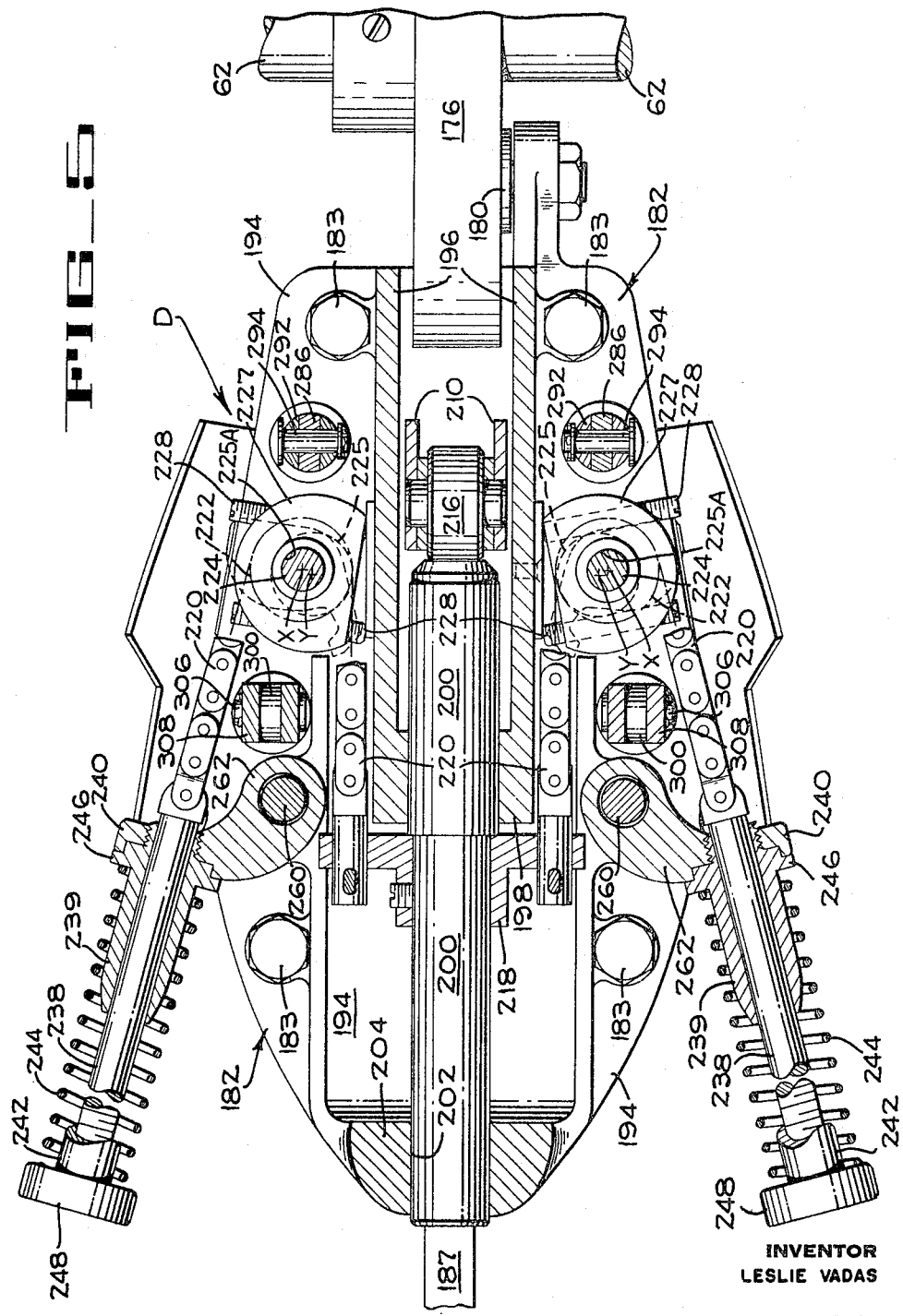

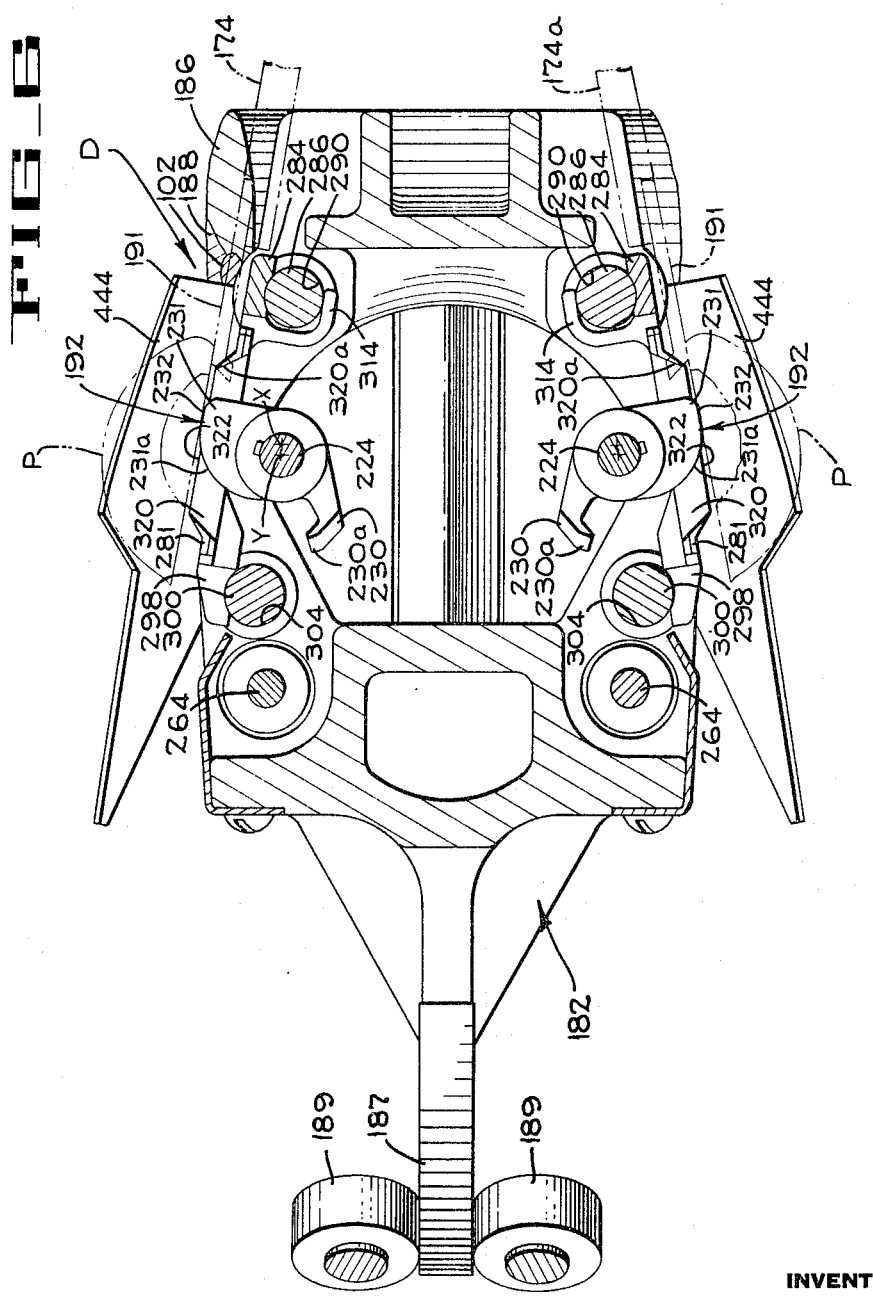

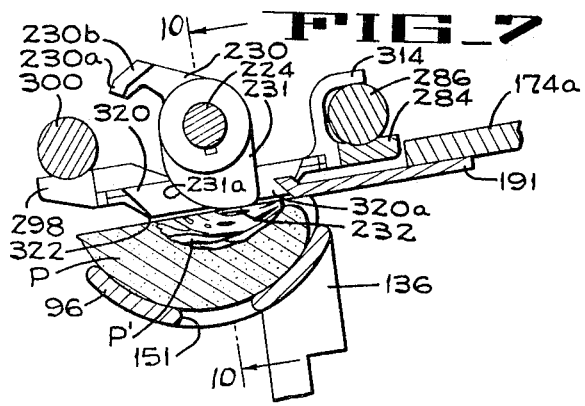
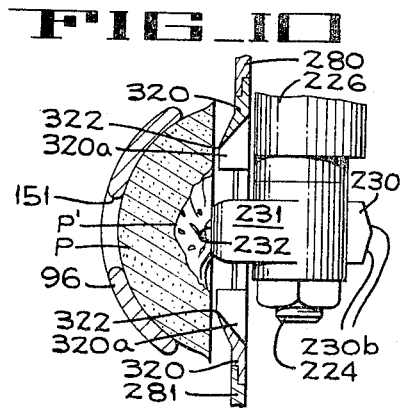
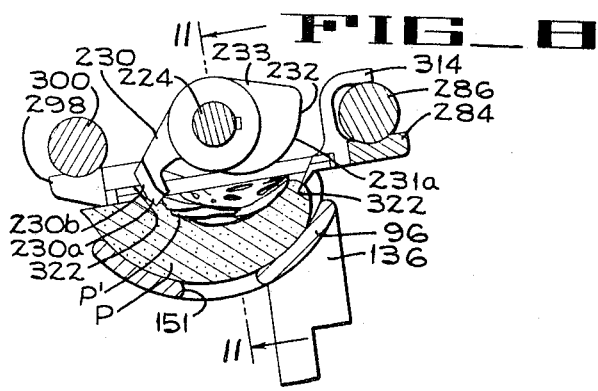
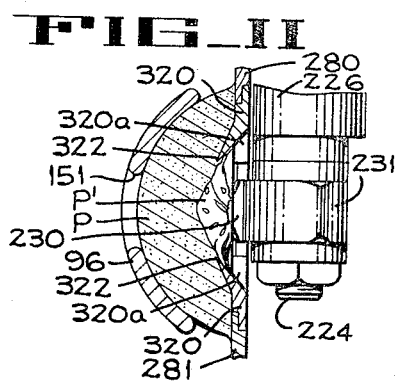
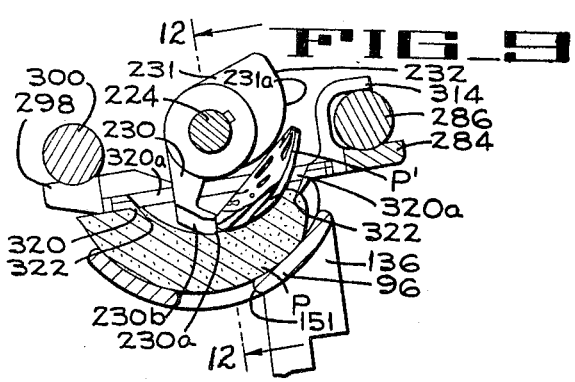
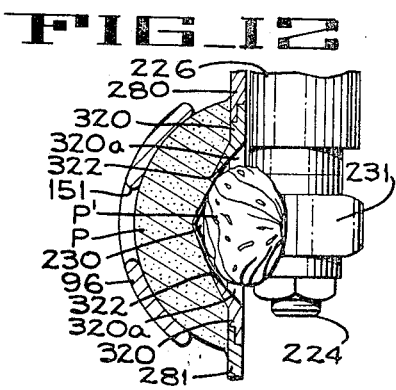
INVENTOR
LESLIE VADAS United States Patent Office 3,280,868
Patented Oct. 25, 1966

3,280,868
PITTING HEAD FOR FRUIT PREPARATION MACHINE
Leslie Vadas, Los Gatos, Calif., assignor to FMC Corporation, San Jose, Calif., a corporation of Delaware
Original application July 1, 1963, Ser. No. 291,997, now Patent No. 3,225,904, dated Dec. 28, 1965. Divided and this application Feb. 1, 1965, Ser. No. 436,399
11 Claims. (Cl. 146—28)

The present invention pertains to fruit processing machines and more particularly relates to machines for halving and pitting peaches.

The present application is a divisional application of Patent Number 3,225,904 and provides an improved peach pitting head for use in a peach pitting machine of the type disclosed in the A. R. Thompson Patent 2,376,526. In the Thompson machine, a peach is sawed in half along its suture plane, and the pit half is removed from each peach half by making a cut around the curved side of the pit half to free the pit half. Since it is difficult to cut close to the pit, a certain amount of flesh is cut away and lost with each pit half.

In distinction, the pitting head of the present invention removes the pit segments from the peach halves by pushing the pits away from the flesh of the fruit. As a result, the weight yield of fruit processed in the machine is increased because less fruit flesh is lost during separation of the pit segments than is lost by cutting out the pit. Also, the appearance of the pitted fruit is enhanced because the peaches thus pitted have the appearance of the commercially more desirable freestone peach varieties.

Included in the pitting head of the present invention is a novel and efficient combined pit support and pit removing hook that supports each pit segment during positioning of the peach and then rotates to effect a positive removal of the pit.

One of the objects of the present invention is to provide an improved pitting head for a peach pitting machine.

Another object of this invention is to provide a pitting head effective in handling peaches and pits differing widely in size.

These objects, as well as other objects and advantages of the present invention, will become evident from the following description and the accompanying drawings in which:

FIGURE 1 is a perspective of a peach pitting machine incorporating the pitting head and cooperating fruit receiving cups of the present invention.

FIGURE 2 is a fragmentary longitudinal section taken inside of the near side plate of the pitting machine shown in FIGURE 1.

FIGURE 3 is a fragmentary elevation, partly broken away, of the pitting head of the present invention in position for receiving the unpitted halves of a peach.

FIGURE 3A is an isometric of a casting which forms the main frame and upper portion of the pitting head.

FIGURE 4 is a fragmentary vertical section taken illustrating a timing mechanism for controlling the pitting head.

FIGURE 4A is a fragmentary perspective of the timing mechanism illustrated in FIGURE 4.

FIGURE 5 is a substantially horizontal section of the pitting head of the present invention and is taken on line 5—5 of FIGURE 2.

FIGURE 6 is a generally horizontal section through the pitting head illustrated in FIGURE 3, and is taken on line 6—6 thereof.

FIGURES 7-9, inclusive, are successive diagrammatic operational views illustrating the removal of the pit segments from a peach half.

FIGURES 10-12, inclusive, are diagrammatic operational sections taken on corresponding section lines shown in FIGURES 7 to 9, respectively.

The peach pitting head of the present invention is adapted for use in a peach processing machine M (FIGS. 1 and 2) of the aforesaid Thompson type. The peach processing machine M includes a peach feeding mechanism A that carries manually impaled peaches, having their suture planes disposed in vertical planes, rearwardly to a rotary transfer head B (FIG. 2). The transfer head B removes the peaches from the feed mechanism A and transports them in a circular path through a saw C, that cuts the peaches in half along their suture planes, and then to a pitting head D which pulls the pit segments from the peach halves. The pitted peach halves are then deposited in a discharge chute E which guides the pitted peach halves out of the machine. The present invention is particularly concerned with the transfer head B, and the pitting head D.

Included in the peach feeding mechanism A are two endless roller chains 24 and 25 to each of which a plurality of spaced upstanding impaling blades 26 are secured. The two roller chains 24 and 25 are spaced apart at the feed end of the machine, thus providing two spaced feed stations 28 and 30 (FIG. 1) from which the chains converge to carry their respective impaling blades in a single lane leading into the area of the rotary transfer head B. Although the chains 24 and 25 are alongside each other, the blades 26 are offset so that their cutting edges follow the same path. The two chains 24 and 25 are trained around idler sprockets, not shown, which are mounted on shafts 32 and 34, respectively (FIG. 1), adjacent the feed stations 28 and 30. Disposed under the saw (FIG. 2) are two drive sprockets 38, only one being shown, which are fixed on a drive shaft 40 and which simultaneously drive the chains 24 and 25, respectively.

The drive shaft 40 (FIGS. 1 and 2) is journalled for rotation in bearings 42 and 44 which are secured in respective side plates 46 and 48 of the machine frame. Outwardly of the plate 48, a gear 50 is secured to the shaft 40, and the gear 50 is in mesh with a large drive gear 52. The gear 52 drives a transverse shaft 54 by means including a hub 55 which is keyed to the shaft 54 and is adjustably bolted to the gear 52. The shaft 54 is journalled in bearings, not shown, secured to the side plates 46 and 48.

A small spur gear 60 (FIG. 1) is meshed with the upper portion of the gear 52 and is keyed to a shaft 62 which extends across the machine and through both side plates 46 and 48. The shaft 62 is journalled in bearings 66, only one of which is shown, that are mounted on the side plates 46 and 48. Adjacent the side plate 46, the shaft 62 is secured to a clutch, not should, which is driven by a sprocket and roller chain drive unit 67 (FIG. 2). The chain of the drive unit 67 is trained around a sprocket 68 which is secured to a shaft 70 of a unitary electric drive motor and transmission 72. The motor and transmission unit 72 is mounted on a platform 73a which is part of a rear wall 73 that extends between the side plates 46 and 48. A shaft 70a projects from the other end of the motor and transmission unit 72 and adjacent the side plate 48 (FIG. 1), the shaft 70a is keyed to a double groove V-belt pulley 74 which drives a pair f V-belts 76. The belts 76 are also trained around a double groove pulley 78 that is fixed to a shaft 80 which carries the saw C (FIG. 2). The shaft 80 is journalled in a bearing bracket 81 depending from the rear wall 73. During operation of the peach pitting machine M, the motor and transmission unit 72 provides a continuous rotation of the shafts 54, 62, 70a and 80 in the directions indicated by their respective direction arrows in FIGURE 2.

Each peach impaling blade 26 (FIGS. 1 and 2) has a sharpened edge 82 and a rear or trailing portion extending outwardly beyond the edge 82 that is provided with a rounded, unsharpened leading nose 84. A shroud 86 covers the forwardmost impaling blades adjacent each feed station and, as an impaling blade leaves the shroud and travels toward the machine, each operator aligns the stem indent of a peach with the nose portion 84 while the peach is held with the suture plane substantially vertical. By allowing the nose 84 to firmly seat in the stem indent, and by then rotating the peach forwardly and downwardly, the sharpened edge 82 is caused to impale the peach along its suture plane. In this position, the long axis of the pit of the peach lies substantially parallel to the sharpened edge 82 and the lower edge of the pit is adjacent to, or in contact with, the blade.

As each peach is carried forwardly on the impaling blade 26 toward the saw C, it passes between two transversely spaced spring-urged centering rollers 88 that are interconnected by gear segments 90 for simultaneous movement toward and away from the impaling blade. The peach is thus urged toward a centered position on the impaling blade. Immediately behind the centering rollers 88, and rotatably mounted in the vertical plane of the impaling blades 26, is a cutting disc 92. The lower portion of the disc 92 cuts into the upper portion of the peach along its suture plane and guides the peach onto a fixed, elongated guide blade 94 which enters the cut made by the disc 92. During movement of the peach along the guide blade 94, two of a plurality of oppositely disposed cup segments 96, which are carried by the transfer mechanism B, close upon opposite sides of the peach. Only the cup segments 96 which are adjacent the side plate 46 are shown.

The transfer mechanism B includes a plurality of the cups 96 (FIG. 2) which are carried in spaced array by a star shaped hub member 98 at one side of the vertical plane in which the impaling blades 26 lie, and an opposed plurality of the cups 96 carried by a similar, but opposite hub member, not shown, at the other side of the blades 26. The hub members are integral with a connecting sleeve 102 which is keyed to the shaft 54.

Since the spacing between adjacent impaling blades 26 (FIG. 2) is closer than the spacing between adjacent feed cups 96, it will be evident that the transfer head B rotates to advance the peach at a greater speed than the speed at which the blades 26 are moved. Accordingly, the peach is gripped in the cups and is moved rearwardly away from the impaling blade 26 over an upwardly curved rear portion of the fixed guide blade 94.

The saw C (FIG. 2) has a circular blade 172 which is rotatably mounted in the same vertical plane as the blades 26 and 94, with the peripheral edge of the saw blade being located near the end of the guide blade 94. As the peach is carried by a pair of the cups 96 through the path of the saw blade 172, the peach and the pit are severed into two portions. Immediately following the sawing operation, the halves of the peach are separated by two juxtaposed, arcuate and diverging spreader blades 174 and 174a (FIGS. 2 and 6). The lower ends of the spreader blades lie adjacent the saw blade 172 and each blade has a lower end portion 175 (only one being shown) which is feather-edged to provide a smooth transition surface for the halved peach moved upwardly onto the blade.

The peach halves are slid along the diverging spreader blades 174, 174a by the transfer mechanism B, and at a point above and slightly ahead of the shaft 54, the forwardly moving peach halves index with the pitting head D when the head is at the rearward limit of its reciprocating movement.

As is clearly seen in FIGURE 2, the upper end of the spreader plate 174a is provided with a peach support plate 191 which is coplanar with the outer surface of the spreader plate. A similar peach support plate, not seen, is fixed to the other spreader plate and each plate 191 lies adjacent a pit removing assembly 192 of the pitting head D when the head is in its rearmost position. Each peach half is slid over the associated plate 191, by the cup 96 of the transfer head B, to an indexed position with the pit removing assembly 192, at which time the pitting head D moves toward the feed end of the machine in synchronism with the cups 96. During this movement the half pit in each segment is removed from the peach in a manner to be presently described.

The pitting head D (FIGS. 2, 3 and 3A) is reciprocated in the machine M by means of a pitting head cam 176 which is mounted for rotation with the shaft 62 and is disposed between the side plates 46 and 48. The pitting head cam 176 has a cam groove 178 in one side face which receives a cam follower roller 180, the roller 180 being pivoted to a top casting 182 of the pitting head. The top casting 182 is secured by bolts 183 to the upper surface of a vertically elongate main body casting 184. The lower end portion of the body 184 is provided with a semicircular hub 186 (FIG. 2) that is journalled for free rotation on the sleeve 102 between the two star-shaped hubs 98 of the transfer mechanism B.

A semicircular bearing cap 188 is bolted to the hub 186 to permit pivotal mounting of the pitting head on the sleeve 102. In order to prevent lateral movement of the pitting head, the forward end of the body 184 (FIGS. 2 and 6) has a vertically disposed outwardly projecting arcuate guide bar 187 formed integral therewith which is held between two fixed guide rollers 189. The rollers 189 are mounted on a generally U-shaped bracket 190 (FIG. 1) extending between, and bolted to, the side plates 46 and 48.

The pitting head D includes two of the pit removing assemblies 192 (FIGS. 3, 5 and 6) which are transversely aligned and oppositely constructed so as to each confront one of the peach segments moved along the spreader blades 174 and 174a. Accordingly, a description of one pit removing assembly 192 is equally applicable to the other, and the similar parts in both assemblies are given the same reference numeral.

The top casting 182 of the pitting head D comprises a generally flat top plate 194 which has two integral longitudinally extending, upwardly projecting flanges 196 (FIG. 3A) that are interconnected at their forward ends by an apertured wall 198. A pit hook actuating shaft 200 is slidably disposed in the wall 198 and extends through an aligned aperture 202 in a boss 204 which is formed on the front end portion of the flange 194. Adjacent and above the rear end of the shaft 200, a transverse pivot shaft 206 (FIG. 3) extends through aligned apertures provided in the uppermost portions 208 of the flanges 196.

Disposed between the upper portions 208 and pivoted upon the shaft 206 is a channel-shaped actuating lever 210 which is pivotally secured adjacent its upper end by a pin 212 to an actuating link 214. As will be explained presently, the lower end of lever 210 is operatively engaged with the sliding shaft 200 and it is the general function of the link 214 to prevent forward movement of the upper end of the channel shaped lever 210 as the pitting head D is moved forward in the machine by the cam 176 so as to slide the pit hook actuating shaft 200 relative to the pitting head.

The lower end portion of the lever 210 (FIGS. 3 and 5) carries a roller 216 which bears against the adjacent end of the pit hook actuating shaft 200. It will be seen, therefore, that when the pitting head D moves toward the feed end of the machine from its rearmost position illustrated in FIGURE 3, the lever 210 will pivot around the shaft 206 and the roller 216 will cause the shaft 200 to slide forwardly in the pitting head.

When the shaft 200 is moved forward relative to the pitting head, a crosshead 218 (FIG. 5) which is secured thereto intermediate its ends, simultaneously pulls two pit hook actuating roller chains 220. Each chain 220 is of double-width construction (see FIG. 3) and is trained around a pair of associated sprockets 222 (indicated by pitch lines in FIG. 5). Each pair of sprockets is secured to a pit hook shaft 224 which is journalled for rotation in a cylindrical sleeve 225 that extends through a depending boss 226 (FIG. 3A) formed on the top plate 194 of the body 182.

It is to be noted that each pitting hook shaft 224 (FIG. 5) is received in an eccentric bore 225A in the sleeve 225 and rotates around an axis indicated by the cross X. Each cylindrical bearing sleeve 225 is rotatable in the boss 226 around an axis indicated by the cross Y. This mounting of the pitting hook shafts 224 permits the shafts to be adjusted toward or away from the respective peach segments. The upper end of each bearing sleeve 225 (FIGS. 3 and 5) has an integral collar 227 which abuts the upper surface of the flange 194. A set screw 228 is threaded through the collar at each side of the shaft 224 and the inner ends of the set screws 228 bear against the flange 196. By adjusting the set screws, the rotative position of the bearing sleeve 225 can be adjusted and this rotation, accordingly, moves the axis Y of the pitting hook shaft 224 toward or away from the peach half.

The lower end portion of each pitting hook shaft 224 has a pitting hook 230 (FIGS. 3 and 6) secured thereon. Integrally formed with the pitting hook 230 is a pit support block 231 which is movable in the same plane as the hook. The pit support block 231 has a generally flat outer surface 232 which is positioned, when in a peach receiving condition, substantially coplanar with the support plate 191 at the upper end of each spreader plate 174 or 174a.

The double chain 220 (FIG. 5) is connected to one end of a rod 238 which is slidably disposed in a bearing sleeve and spring mount 239 that is screwed into an outwardly projecting threaded ear 240 of the top plate 194. The other end of the rod 238 is threaded and has a combination spring seat and spring retainer element 242 screwed thereon. A compression spring 244 is mounted on the rod 238 and is held in compression between a collar 246 of the bearing sleeve 239, and a collar 248 of the spring seat 242, to normally tension the chains 220.

Accordingly, when the pitting head D is moved forwardly in the machine by the cam 176 to cause sliding forward movement of the shaft 200 relative to the pitting head, the crosshead 218 exerts a pull on the chains 220, thus compressing the springs 244 and rotating the associated pitting hook shafts 224. When the pitting head D returns to its former position, the compressed springs return the chains 220 and sprockets 222 to their initial positions. During each rotation of the pitting hook shafts 224, each pitting hook 230 is carried through approximately 180° of angular movement to effect removal of the pit segment. This pitting operation is most easily observed in conjunction with the progressive operational views in FIGURES 7–12 and will later be more fully explained.

Both ends of the pivot shaft 206 FIGS. 3 and 3A project outwardly beyond the adjacent cars 208 of the flanges 196, and a rocker arm 252 (FIG. 1) is secured to each end by a pin 254. The forward end portion of each rocker arm 252 is provided with a roller 256 that is mounted for rotation on a rod 258 and bears against the upper end of a shaft 260 which is slidable in an upstanding boss 262 of the top plate 194. The lower end of the shaft 260 is provided with a threaded bore, not seen, in which is adjustably threaded a spring holder 264. In alignment with the spring holder 264 is a spring holder 266 that is bolted to an outwardly directed lower flange 268 of the pitting head body casting 184. The two spring holders 264 and 266 cooperate to mount a compression spring 270 therebetween which urges the shaft 260 upwardly.

Each rocker arm 252 carries a cam follower roller 272 which is rotatably mounted on an upstanding integral tab 274 of the arm, the roller being held by the force of the spring 270 in engagement with the lower edge of a cam plate 276. The cam 276 depends from a fixed transverse bridge 277 (FIGS. 1 and 2) which is bolted to the side plates 46 and 48. The cam 276 includes a nose portion 278 which is adjustably bolted through a slot 280 to the fixed portion of the cam 276.

Reciprocating movement of the pitting head D causes the cam 276 to depress the forward end of the rocker arm 252 at each limit of the pitting head stroke, while the spring 270 maintains contact of the rocker arm roller 272 with the cam. The resultant rocking movement of the rocker arm 252 (FIG. 3) opens and closes two superposed, coplanar and cooperating cutter support plates 280 and 281 that are slidably disposed between the flanges 194 and 268 of the pitting head D.

In the rearmost position of the pitting head, (FIG. 2) the fruit support plate 191 of each spreader plate partially overlaps the associated pair of peach support plates 280 and 281. Thus, as can be seen in FIGURE 6, as each peach half P is advanced by a cup 96 into an indexed position with the pitting head D, its cut face is supported on the fruit support plate 191 and then advanced to a position wherein its pit half rests on the pit support 231 of the pitting hook.

The peach support plate 280 on each pit removing assembly 192 (FIGS. 3 and 6) is formed with a long side 284 which is secured to a shaft 286 that is slidably mounted in aligned apertures 288 and 290 of the top plate 194 and the bottom flange 268, respectively. The upper end of the shaft 286 carries a link 292 pivoted thereto by a pin 294, the link also being pivotally connected by a pin 296 to a bifurcated rear end of the rocker arm 252.

The peach support plate 281 is provided with a long side 298 that is secured to a shaft 300 which is slidable in aligned apertures 302 and 304 of the top plate 194 and the bottom flange 268, respectively. The shaft 300 has its upper end pivotally connected by a pin 306 to a link 308 which is pivotally secured to the forward end of the rocker arm 252 by a pin 310. It will, accordingly, be apparent that rocking movement of the rocker arm 252 in the manner already described will cause the peach support plates 280 and 281 to move toward and away from each other. During such movement of the peach support plates, their coplanar relationship is maintained by a forked end 312 (FIG. 3) of plate 280 and a forked end 314 of plate 281, which respectively embrace flat portions 315 of the actuating shafts 300 and 286.

The peach support plates 280 (FIG. 3) and 281 are provided with arcuate recesses 316 and 318, respectively, which are adapted to form, when the plates 280 and 281 are in abutting relation, an elliptical pitting opening through which the pitting hook 230 moves to remove the pit from a peach half. The recess 316 and 318 of each peach support plate 280 and 281 is provided with a blade 320 (FIGS. 3 and 6) affixed thereto, said blade having an arcuate cutting edge 322 lying in a plane outwardly from the associated peach support plate 280 or 281, but slightly inward of the outermost surface 232 of the pit support boss 231.

Each blade 320 converges in both directions from the center of the pitting aperture along the stem-blossom axis of the associated peach segment. The inner surfaces of each pair of adjacent blades cooperate to form an arcucuate pit camming surface 320a, by which means the pit, when it is later moved endwise by the pitting hook 230, is cammed inwardly away from the flesh of the peach.

When the peach halves P (FIG. 6) are positioned with their pit segments P' contacting their respective pit supporting bosses 231, and the pitting head D is moved forwardly in the machine by the cam 176, the pitting hook shafts 224 rotate, in the manner previously described, to remove the pit supports 231 from engagement with the pits. Accordingly, the spring-urged peach cups 96 push the peach halves inwardly toward the cutting edges 322 of the gripping blades 320 as the pit supports 231 move inwardly away from the peach segments. Simultaneously with the forward motion of the pitting head D, the rocker arm 252 (FIG. 3) is pivoted around the shaft 206, causing upward and downward movement, respectively, of the shafts 286 and 300. The cutting edges 322 of each cooperating pair of blades 320, therefore, move toward each other and into the peach flesh adjacent the outer curved surface of the pit segment.

While the blades 320 of plates 280 and 281 are closing, the pitting hook shafts 224 move from the initial position shown in FIGURE 6 to simultaneously advance the pit hooks 230 toward the peach following removal of the peach pit supporting bosses 231 from engagement with the pit. At the same time, each cup 96 is given an additional thrust toward the peach segment P, in order to positively secure the peach against lateral movement during removal of its pit, by means of an adjustable camming unit illustrated and described in Patent No. 3,225,904.

Means are provided to adjust the timing of the pit hook rotation in order that the pitting head D may be preset to accommodate different ranges of pit sizes which may be accommodated with a given size of gripping blades 320. This adjustment is effected by a pitting head timing mechanism 370 (FIGS. 4 and 4A). It will be recalled that when the pitting head D is moved forwardly in the machine, the link 214 which is pivoted to the upper end of the lever 210, causes the lever 210 to rotate around the shaft 206. By means of the pit hook actuating shaft 200 (FIG. 5) and its associated chains 220 and other mechanism already described, the pit hooks 230 are simultaneously rotated during pivoting of lever 210 to cam the pit segments from the peach halves.

Referring to FIGURES 4 and 4A, the end 214A of the link 214, which is remote from the pitting head D, is connected by a pivot pin 372 to an arm 374 of a cam-actuated pivotal bracket 376 that is part of the timing mechanism 370.

The bracket 376 is pivoted upon a rod 378 that is carried in the end portion of a swinging arm 380. The arm 380 is formed on a hub 382 which has a forwardly extending cam follower arm 384 and a cam follower roller 386 pivoted to the arm. The hub 382 is provided with an axial shaft 388 which is fixed in a hub 390 that is formed on a plate 392, the plate 392 being bolted to the side plate 48. The other end of shaft 388 is fixed to a support bracket 394 that depends from a transverse frame reinforcing shaft 396.

A disc cam 398 is mounted on the shaft 62 in a vertical plane which includes the follower roller 386. A rearwardly extending tension spring 402 is connected to an arm 400 of the hub 382 and to a frame bolt 404 in order to maintain contact of the roller 386 with the cam 398. The cam roller 386 is illustrated in a position on the cam 398 corresponding to the time when the pitting head D is in its rearmost position and will next move forwardly in synchronism with a peach. As the pitting head D moves away from the timing mechanism 370, the rotation of the disc cam 398 causes a reduced diameter camming surface 398a of the cam to be moved under the follower roller 386. Since the pitting head D is moving forwardly, the link 214 is urged in the direction of the arrow 420 and the arm 380 pivots clockwise around the pivot shaft 388 as follower 386 moves along the cam surface 398a. Up to this time the pitting hooks 230 are not actuated because the forward motions of the link 214 and the pitting head D are at approximately the same velocities.

Continued advancement of the pitting head D causes the arm 380 to carry forwardly the pivot bracket 376 to which the link 214 is attached. Thus, a follower roller 424 that is pivoted to an arm 426 of the pivot bracket 376 rolls up an inclined or arcuate portion 428 of a cam groove 430 in which the roller is disposed. When the roller 424 traverses the cam groove portion 428, it will be seen that the arm 426 will be pivoted clockwise about rod 378 and cause the arm 374, to which link 214 is attached, to pull the link rearwardly and rotate the pitting hooks 230 in the manner previously described.

The cam groove 430 is formed in a cam block 432 which is secured to the plate 392 by bolts 434 that are threaded in tapped holes in the plate 432 and have outer end portions slidable in slots 435 formed in the plate 392. The block 432 can be adjusted fore and aft on the plate 392, when the bolts 434 are loosened, by means of a stud 436 which is threaded into one end of the block 432. The stud 436 is rotatable, but axially immobile, in an ear 438 of plate 392 and is provided with a knurled knob 440 on its outer end so that the block 432 may be moved to any position within its limits of movement.

From the foregoing, it will be evident that the position of the cam block 432 controls the timing of the pitting hook actuation in relation to the position of the pitting head D, because the cam groove 430 in the block controls the time at which the pitting hooks begin to rotate.

*Operation*

The pit removing sequence of operations will be described with reference to FIGURES 7–12, inclusive. At its rearward limit of movement the pitting head D dwells until the segments of a peach carried by a cooperating pair of the cups 96 attain positions wherein their pits P' are substantially indexed with the openings defined by the pit finder blades 320. This rearward dwell period of the pitting head D is effected by a dwell portion 178a (FIG. 3) of the cam groove 178 in the pitting head cam 176.

As soon as the peach halves are indexed with the openings in the pit finder blades 320, the cam follower 180 of the pitting head D is caused to accelerate the pitting head forwardly in the machine in synchronism with the cups 96, by means of a camming portion 178b. Later, after the head D has been moved to its forward limit, the head is caused to dwell in that position by an outer dwell portion 178c of cam 176. The head is carried to its rearward limit, after its forward limit dwell, by a camming portion 178d (FIG. 2) whereby it again dwells at the rearward limit to index with the next pair of cups 96.

As the pitting head D moves forwardly in synchronism with the aligned peach segments, the camming portion 398a (FIG. 4) of the cam disc 398 withdraws support from the roller 386 and the pivot arm 380 swings forwardly due to the pull of spring 402 and the pull exerted by the pitting head actuating link 214. Near the end of this forward movement of the arm 380, the link 214 is arrested by the timing mechanism 370 and the pitting hooks 230 (FIGS. 5 and 6) begin their rotation to cam out the pit segments.

At the time each peach segment P (FIGS. 6, 7 and 10) reaches its properly indexed position with the temporarily immobilized pitting head, the flat pit support surface 232 of the pit support block 231 is substantially coplanar with the discharge plate 191 and is in a position holding the cut face of the pit P' outwardly beyond the path of the cutting edges 322 of the pit gripping blades 320. The peach P is being urged toward the pit hook 230 at this time by springs associated with the cups 96.

As the pit hook 230 (FIGS. 6, 8 and 11) begins its rotation, a curved transition surface 231a thereof moves into contact with the pit P'. The profile of the transition surface 231a is such that it progressively moves away from the pit P' whereby he peach segment is moved inwardly by the force of the spring-urged cup 96. Meanwhile, the forwardly moving pitting head D has brought the cam roller 272 (FIG. 3) of the pit gripping actuating mechanism into contact with a depending portion 278a (FIG. 2) of the cam 278 whereby the pit gripping blades 320 move toward each other and enter the peach flesh to substantially surround the pit P'.

As can be clearly seen in FIGURE 11, the medial portions of the pit gripping blades 320 close upon the sides of the pit and firmly engage the same. If the pit is a very small one, it is possible for the pit gripping blades 320 to close until they abut and the pit is entirely surrounded; normally, though, the area of contact of the pit with the gripping blades 320 is limited to the portions adjacent the central portions of the longitudinal edges of the pit. In either event, the sloping cutting edge walls 322 of the gripping blades 320, which blades converge in both directions along the stem to blossom axis of the fruit and form the cooperating camming surfaces 320a, cause the pit P', when it is moved in a similar, axial direction, to be cammed out of the pit cavity of the peach.

The pit camming operation is shown in FIGURE 9 wherein a blunt nose portion 230a of the pitting hook 230 has been moved to contact and push the pit whereby the converging camming surfaces 320a presented by the inner faces of the pit gripping blades 320 cause ejection of the pit along an arcuate path. It is to be especially noted that the peach flesh adjacent the stem end of the peach and defining one end of the pit cavity is not harmed because the pit is under positive control of the camming surfaces 320a to move the pit inwardly away from the flesh. Also, as is shown in FIGURES 9 and 10, the outer surface of the pit hook is beveled at 230b so that the shape of the hook which sweeps through the pit cavity conforms closely to the shape of the cavity. In this way any broken pit fragments are bodily removed from the cavity along the pit. A wing-like shield 444 (FIG. 6) is secured to each side of the pitting head D below each pitting hook 230 whereby the pits and pit fragments are collected and carried to guide means, not shown, which directs the pit and pit fragments away from the pitting head.

While a particular embodiment of the present invention has been shown and described, it will be understood that the particular details herein set forth are capable of modification and variation without departing from the principles of the invention, and that the scope of the invention should be limited only by the scope and proper interpretation of the claims appended hereto.

I claim:

1. In an apparatus for pitting fruit, a pair of gripping blades mounted for movement toward and away from each other, each of said gripping blades having sharpened cutting edges lying in a common plane and together defining an elliptical pitting opening, means holding said gripping blades in spaced apart position, a combined pit support member and pitting hook member rotatably mounted opposite said pitting opening, said pit support member having a pit support surface adapted to lie substantially in said common plane, said pitting hook member being adapted to move arcuately through said pitting opening, means for positioning a peach half with the cut surface of its pit engaging said pit support surface and the pit half disposed opposite the pitting opening, means for moving said gripping blades toward each other when the pit is engaged by said pit support surface, means urging the peach half toward said support surface, and means for simultaneously withdrawing said pit support surface from engagement with the pit and moving said pitting hook through the pitting opening to cam the pit endwise from the pit cavity of the peach.

2. In a pitting head, a frame having a wall with an opening therein, means for positioning the pit side of a peach half across said opening, and a one-piece pitting hook and pit support rotatable about a common axis and movable through said opening in a common plane intersecting the pit cavity, said pit support engaging the pit when the pit is positioned across said opening to provide the sole support for the peach half, whereby when said pit support is subsequently withdrawn from engagement with the pit the cut side of the peach half is moved toward said wall opening into the path of movement of said hook and said hook contacts one end of the pit to force the pit lengthwise from the pit cavity.

3. A pitting head in a peach processing machine comprising, a frame, means for reciprocating said frame in alignment with a fruit transported through the machine, a pair of coplanar peach support plates slidably mounted in said frame for synchronous movement toward and away from each other, an arcuate pit gripping blade mounted on the leading edge of said support plates, said gripping blades defining a pitting opening therebetween, means for positioning the pit side of a peach half opposite the pitting opening, a unitary pitting hook and pit support member disposed adjacent said pitting opening and movable through said opening in a path intersecting the pit segment gripped between said pit gripping blades, means urging the peach toward the pitting opening so that the pit engages said pit support member, means for closing said cutting blades to grip the pit between said pit gripping blades, a shaft rotatably mounting said unitary pitting hook and pit support member in said frame, spring means biasing said shaft to one limit of rotation, and linkage means connected to said shaft for releasing said spring means during reciprocal movement of the pitting head to rotate the shaft to its other rotative limit, said pit support member being effective to disengage the pit upon the closing of said pit gripping blades and said pitting hook member being arranged to strike the pit to eject it from the peach half subsequent to the disengaging of the pit with said pit support member.

4. In a fruit processing machine for pitting bisected drupe fruit, a pitting head frame reciprocable in the machine in alignment with a fruit transported therethrough, drive means for reciprocating said pitting head frame, a pair of pit gripping blades mounted on said frame for movement toward and away from each other, said pit gripping blades having oppositely curved sharpened edges disposed in confronting relation and defining a pitting opening, fruit positioning means reciprocated in synchronism with said pitting head frame and adapted to hold a peach half adjacent said pit gripping blades with the cut surface of the pit segments disposed opposite said pitting opening, a shaft rotatable in said pitting head frame, a combined pit support and pitting hook mounted on said shaft, said pitting hook and said pit support being adapted to successively move through said pitting opening to initially support the pit during positioning of the fruit and to then strike the pit segments held by said gripping blades to force it from the pit cavity, resilient means biasing said pit support member to a disengaged position from the pit segments at the rearward limit of movement of said pitting head frame, chain actuating means operatively connected to said pitting hook shaft, and means for tensioning said chain during reciprocating movement of said pitting head frame in one direction in order to rotate said combined pit support and pitting hook member to force the pit segment from the peach.

5. In an apparatus for pitting fruit, a pitting head frame, means for reciprocating said pitting head frame in an arcuate path, means defining a pitting aperture in said frame, a pitting hook movable through said aperture, a shaft rotatably mounting said pitting hook in said pitting head frame, a sprocket secured to one end of said shaft, a member slideable in said frame, a chain trained around said sprocket and having an end portion connected to said slideable member in said pitting head frame, spring means carried by said pitting head frame and connected to the other end of said chain for urging said sprocket toward one limit of rotation, and actuating means operably connected to said slideable member and movable in response to said reciprocating movement of said pitting head frame for overcoming the force of said spring means and urging said sprocket to the opposite limit of its rotation, whereby said pitting hook is moved in and through said pitting aperture.

6. In a fruit processing machine for pitting drupe fruit a pitting head frame, two outwardly directed arcuate pit gripping blades mounted in said frame in opposed relation for movement toward and away from each other and defining a pitting opening therebetween, a pit support member rotatably mounted in said frame and having a pit support surface movable to an outer position in substantially coplanar relation with the outer edges of said pit gripping blades and to an inner position lying inwardly of said edges, a pitting hook integral with said pit support member rotatably mounted upon the same axis as said pit support for movement in the same plane as the pit support, means for positioning an unpitted half fruit with the cut surface of the pit engaged with said pit support surface, means for urging the fruit toward said pitting head frame, means for simultaneously rotating said integral pitting hook and pit support member, and means for moving said pitting blades toward and away from each other whereby when the pit support is rotated out of supporting relation to the pit, the fruit is urged inwardly toward the pit gripping blades and the edges of the gripping blades penetrate the peach flesh to lie adjacent the curved surface of the pit, said pitting hook being arranged to sweep the pit cavity to force the pit sidewise against the inner surface of the pit gripping blades to cam the pit out of the cavity in an arcuate path.

7. In a fruit processing machine for bisecting peaches and removing the pit segments therefrom, the combination of a pitting frame having a pair of spaced pit gripping blades having arcuate confronting edge portions defining therebetween a pitting opening, fruit transport means for positioning the pit side of a half-fruit across said opening and including a cup mounted for rotation in a circular path in a vertical plane for engaging the uncut side of the fruit, a rotatable turret movable in a plane parallel to said path of said cup, parallelogram linkage connected to said cup and to said turret for effecting substantially linear movement of the cup to and from the turret in alignment with said pitting head frame, a unitary pitting hook and pit support rotatable about a common axis and successively movable through said pitting opening in a common plane intersecting the pit cavity, and means for rotating said pitting hook and said pit support in timed relation to the rotation of said turret, said pit support engaging the pit during said positioning of the fruit to provide the sole support for the peach half and then disengaging the pit permitting the peach half to move toward said pitting opening so that the pit half moves into the path of movement of said pitting hook and the flesh of the peach half adjacent the pit half moves into the path of movement of the pitting blades defining said pitting opening whereby said pitting blades cut into the peach flesh as said pit support disengages the pit and provide camming surfaces cooperating with said pitting hook to guide the pit out of the fruit after said pitting hook strikes one end of the pit to force the pit lengthwise from the pit cavity.

8. In a fruit processing machine, a pitting head for removing the pit segment from a bisected peach wherein the pit segment is enclosed between cooperating arcuate pit gripping blades closely conforming to the curvature of the pit and the pit is moved endwise to be cammed inwardly away from the pit cavity against the inner surfaces of said arcuate blades, the improvement comprising a unitary pit support and pitting hook, said support and hook being movable along a common path intersecting a pit held by said blades, said pit support being arranged to engage the cut surface of the pit during positioning of the peach half and to disengage the pit after the gripping blades close on the pit, and means for rotating said unitary pit support and pitting hook in timed relation to the opening and closing of the arcuate pit gripping blades, said pitting hook being arranged to subsequently sweep through the pit cavity to cam the pit therefrom.

9. In a fruit processing machine for pitting peaches, a pitting head frame, two opposed and coplanar peach support blades mounted for sliding movement in the frame toward and away from each other, each of said support blades having an outwardly directed arcuate pit gripping blade with a sharpened outer edge, the two gripping blades being disposed in opposed relation and defining a substantially elliptical pitting opening therebetween, a pit support member rotatably mounted in said pitting head frame and having a pit support surface movable from an outer position substantially coplanar with the sharpened outer edges of said gripping blades to an inner position inward of said support blades, a pitting hook integrally formed with said pit support member and movable in the same plane as said pit support member, means for positioning an unpitted half fruit with the cut surface of its pit engaged with said pit support surface of said pit support member, means for urging the fruit toward said pitting head frame, means for actuating said pit gripping blades toward a closed position to grip the pit, and means operative subsequent to said gripping blade actuation for rotating said pit support member out of engagement with the pit to cause the gripping blades to penetrate the peach flesh around the pit and cause said pitting hook to sweep through the pit cavity, thereby pushing the pit against the inner surfaces of said arcuate pit gripping blades and camming the pit inwardly away from the pit cavity.

10. In a fruit processing machine for pitting peaches, timing means for controlling the pitting operation comprising a pitting head frame reciprocable in the machine in alignment with a fruit, drive means for reciprocating said frame, a rotatable shaft mounted in said frame, a pitting hook secured to said shaft, pitting hook actuating means connected to said shaft and reciprocable with said frame, said actuating means including a rigid link and being arranged to rotate said shaft upon relative movement of said frame and said link, and means connected to said link for retarding forward movement of the link during a preselected time interval while said frame is moving in the same direction.

11. In a fruit processing machine for pitting peaches, timing means for controlling the pitting operation comprising a pitting head frame reciprocable in the machine in alignment with a fruit, drive means for reciprocating said frame, a rotatable shaft mounted in said frame, a pitting hook secured to said shaft, pitting hook actuating means connected to said shaft and reciprocable with said frame, said actuating means including a rigid link and said pitting hook actuating means being arranged to rotate said shaft upon relative movement between said frame and said link, first cam controlled means operatively associated with said link for advancing the link at the same velocity as said pitting head frame, and second cam controlled means operatively associated with said link and arranged to retard said link independently of said first cam controlled means at a preselected time during said advancing movement of said link.

References Cited by the Examiner
UNITED STATES PATENTS

| | | | |
|---|---|---|---|
| 2,376,526 | 5/1945 | Thompson | 146—28 |
| 3,045,730 | 7/1962 | Wilbur et al. | 146—28 |
| 3,075,566 | 1/1963 | Anderson | 146—28 X |
| 3,132,675 | 5/1964 | Reimers et al. | 146—28 |

ROBERT C. RIORDON, *Primary Examiner.*

WILLIE G. ABERCROMBIE, *Examiner.*